(12) United States Patent
Hunt et al.

(10) Patent No.: US 7,949,639 B2
(45) Date of Patent: *May 24, 2011

(54) ATTRIBUTE SEGMENTS AND DATA TABLE BIAS REDUCTION

(75) Inventors: Herbert Dennis Hunt, San Francisco, CA (US); John Randall West, Sunnyvale, CA (US); Marshall Ashby Gibbs, Clarendon Hills, IL (US); Bradley Michael Griglione, Lake Zurich, IL (US); Gregory David Neil Hudson, Riverside, IL (US); Andrea Basilico, Lomazzo (IT); Arvid C. Johnson, Frankfort, IL (US); Cheryl G. Bergeon, Arlington Heights, IL (US); Craig Joseph Chapa, Lake Barrington, IL (US); Alberto Agostinelli, Trezzo sull'Adda (IT); Jay Alan Yusko, Lombard, IL (US); Trevor Mason, Bolingbrook, IL (US)

(73) Assignee: SymphonyIRI Group, Inc., Chicago, IL (US)

( * ) Notice: Subject to any disclaimer, the term of this patent is extended or adjusted under 35 U.S.C. 154(b) by 422 days.

This patent is subject to a terminal disclaimer.

(21) Appl. No.: 12/021,495

(22) Filed: Jan. 29, 2008

(65) Prior Publication Data

US 2009/0006490 A1    Jan. 1, 2009

Related U.S. Application Data

(63) Continuation-in-part of application No. 12/021,263, filed on Jan. 28, 2008, and a continuation-in-part of application No. 10/783,323, filed on Feb. 20, 2004, now Pat. No. 7,873,529.

(60) Provisional application No. 60/886,798, filed on Jan. 26, 2007, provisional application No. 60/886,801, filed on Jan. 26, 2007, provisional application No. 60/887,122, filed on Jan. 29, 2007, provisional application No. 60/891,933, filed on Feb. 27, 2007, provisional application No. 60/979,305, filed on Oct. 11, 2007, provisional application No. 60/891,507, filed on Feb. 24, 2007.

(51) Int. Cl.
*G06F 7/00* (2006.01)

(52) U.S. Cl. ...................................... 707/688

(58) Field of Classification Search .................. 707/688, 707/776, 803, 999.001, 705
See application file for complete search history.

(56) References Cited

U.S. PATENT DOCUMENTS 5,041,972 A    8/1991    Frost
(Continued)

FOREIGN PATENT DOCUMENTS

WO    WO-01/80137 A2    10/2001
(Continued)

OTHER PUBLICATIONS

"U.S. Appl. No. 12/020,740, Non-Final Office Action mailed Jan. 28, 2010", U.S. Appl. No. 10/783,323 , 155.
(Continued)

*Primary Examiner* — Kimberly Lovel
*Assistant Examiner* — Mohammed R Uddin
(74) *Attorney, Agent, or Firm* — Strategic Patents, P.C.

(57) ABSTRACT

The present invention provides a method for updating data sources. The method may include identifying a plurality of data sources, identifying a plurality of overlapping attribute segments to use for comparing the data sources, calculating a factor as a function of each of the plurality of overlapping attribute segments, and using the factors to update a first group of values in the second data source to reduce bias. Further, at least a first data source is more accurate than a second data source.

11 Claims, 9 Drawing Sheets

U.S. PATENT DOCUMENTS

| | | | | |
|---|---|---|---|---|
| 5,758,257 | A | * | 5/1998 | Herz et al. ............... 725/116 |
| 5,978,788 | A | | 11/1999 | Castelli et al. |
| 6,163,774 | A | | 12/2000 | Lore et al. |
| 6,233,573 | B1 | | 5/2001 | Bair et al. |
| 6,282,544 | B1 | | 8/2001 | Tse et al. |
| 6,401,070 | B1 | * | 6/2002 | McManus et al. .......... 705/1.1 |
| 6,636,862 | B2 | | 10/2003 | Lundahl et al. |
| 6,642,946 | B1 | | 11/2003 | Janes et al. |
| 6,662,192 | B1 | | 12/2003 | Rebane |
| 6,708,156 | B1 | * | 3/2004 | Gonten ........................ 705/10 |
| 6,920,461 | B2 | | 7/2005 | Hejlsberg et al. |
| 7,027,843 | B2 | | 4/2006 | Cromer |
| 7,133,865 | B1 | | 11/2006 | Pedersen et al. |
| 7,177,855 | B2 | | 2/2007 | Witkowski et al. |
| 7,239,989 | B2 | | 7/2007 | Kothuri |
| 7,269,517 | B2 | | 9/2007 | Bondarenko |
| 7,333,982 | B2 | | 2/2008 | Bakalash et al. |
| 7,360,697 | B1 | | 4/2008 | Sarkar et al. |
| 7,499,908 | B2 | | 3/2009 | Elnaffar et al. |
| 7,523,047 | B1 | | 4/2009 | Neal et al. |
| 7,606,699 | B2 | | 10/2009 | Sundararajan et al. |
| 7,800,613 | B2 | | 9/2010 | Hanrahan et al. |
| 2002/0099597 | A1 | | 7/2002 | Gamage et al. |
| 2002/0116213 | A1 | | 8/2002 | Kavounis et al. |
| 2002/0169657 | A1 | | 11/2002 | Singh et al. |
| 2003/0028417 | A1 | | 2/2003 | Fox |
| 2003/0046120 | A1 | | 3/2003 | Hoffman |
| 2003/0046121 | A1 | | 3/2003 | Menninger |
| 2003/0065555 | A1 | | 4/2003 | von Gonten et al. |
| 2003/0083925 | A1 | | 5/2003 | Weaver et al. |
| 2003/0088474 | A1 | | 5/2003 | Hoffman et al. |
| 2003/0126143 | A1 | | 7/2003 | Roussopoulos et al. |
| 2003/0171978 | A1 | | 9/2003 | Jenkins et al. |
| 2003/0200129 | A1 | | 10/2003 | Klaubauf et al. |
| 2003/0233297 | A1 | | 12/2003 | Campbell |
| 2004/0210562 | A1 | | 10/2004 | Lee et al. |
| 2005/0060300 | A1 | | 3/2005 | Stolte et al. |
| 2005/0240577 | A1 | | 10/2005 | Larson et al. |
| 2006/0080294 | A1 | | 4/2006 | Orumchian et al. |
| 2006/0218157 | A1 | | 9/2006 | Sourov et al. |
| 2008/0033914 | A1 | | 2/2008 | Cherniack et al. |
| 2008/0263000 | A1 | | 10/2008 | West et al. |
| 2008/0263065 | A1 | | 10/2008 | West |
| 2008/0294996 | A1 | | 11/2008 | Hunt et al. |
| 2009/0018996 | A1 | | 1/2009 | Hunt et al. |

FOREIGN PATENT DOCUMENTS

WO    WO-03/001428 A2    1/2003

OTHER PUBLICATIONS

"U.S. Appl. No. 12/020,740, Non-Final Office Action mailed Mar. 30, 2010", , 3.
"U.S. Appl. No. 12/021,268, Non-Final Office Action mailed Mar. 26, 2010", , 12.
"U.S. Appl. No. 10/783,323", *Final Office Action May 8, 2009*, all.
"Brand choice, purchase incidence, and segmentation", *An integrated modeling* RE Bucklin, S Gupta—Journal of Marketing Research 1992—jstor.org.
"Combining sources of preference data", *o Hensher. J Louviere, J Swait—Journal of Econometrics* 1998—Elsevier.
"Commercial use of UPC scanner data", *Industry and academic perspectives* RE Bucklin, S Gupta—Marketing Science, 1999—jstor.org.
"Do household scanner data provide representative inferences from brand choices", *a comparison with store data* S Gupta. P Chintagunta. A Kaul , DR Wittink—Journal of Marketing 1996—jstor.org , 1-16.
"Missing price and coupon availability data in scanner panels", *Correcting for the self selection bias in choice model parameters* T Erdem, MP Keane, B Sun—Journal of Econometrics 1998—Elsevier.
"Parameter bias from unobserved effects in the multinomiallogit model of consumer C Abramson", *C. Abramson, IS Currim . . .—Journal of Marketing* RL Andrews, Am Marketing Assoc 2000.
"Purchase frequency, sample selection, and price sensitivity", *The heavy-user bias* SO Kim. PE Rossi—Marketing Letters 1994—Springer.
Baron, Steve et al., "The Challenges of Scanner Data", *The Journal of Operational Research Society* (vol. 46, No. 1) Jan. 1995, 50-61.
Bronnenberg, Bart J. et al., "Unobserved Retailer Behavior in Multimarket Data: Joint Spatial Dependence in Market Shares and Promotion Variables", *in Market Science 20,3* Summer 2001.
Fangyan, R. et al., "Spatial hierarchy and OLAP-favored search in spatial data warehouse", *Proceedings of the 6th ACM international workshop on Data warehousing and OLAP* New Orleans, Lou isiana, USA Nov. 7-Jul. 2003 , 12.
Guadagni, Peter M. et al., "A Logit Model of Brand Choice Calibrated on Scanner Data", *In Marketing Science*, vol. 2, No. 3 Summer 1983, 203-238.
Inderpa, S. M. et al., "Maintenance of data cubes and summary tables in a warehouse", *Proceedings of the 1997 ACM SIGMOD international conference on Management of data* Tucson, Arizona, Unites States May 11-15, , p. 100-111.
Kong, E B. et al., "Error-Correcting Output Coding Corrects Bias and Variance", http://citeseer.nj.nec.com/kong95errorcorrecting.html , all.
Lohse, G L. et al., "Consumer buying behavior on the Internet: Findings from panel data.", http://knowledge.wharton.upenn,edu/pdfs/793.pdf , all.
McCulloch, Robert et al., "An Exact Likelihood Analysis of the Multinomial Probit Model", *Journal of Econometrics*, vol. 64 1994, 207-240.
Qian, Jiahe et al., "Optimally Weighted Means in Stratified Sampling", , 1-4.
Renard, Y , "Perturbation singuliere d'un probleme de frottement sec non monotone", *"Singular perturbation approach to an elastic dry friction problem with non monotone coefficient"* Quarterly of Applied Mathematics, LVIII, No. 2:303-324, 2000 Apr. 11, 1997 , all.
Swait, Joffre et al., "Enriching Scanner Panel Models with Choice Experiments", *in Marketing Science(22, 4, ABI)* Fall 2003, 442-460.
"U.S. Appl. No. 10/783,323, Notice of Allowance mailed Oct. 6, 2010", , 15.
"U.S. Appl. No. 12/020,740, Final Office Action mailed Oct. 27, 2010", , 2 pgs.
"U.S. Appl. No. 12/020,786, Non-Final Office Action mailed May 11, 2010", , 15.
Chaudhuri, Surajit et al., "An overview of data warehousing and OLAP technology", *Surajit Chaudhuri, Umeshwar Dayal, An overview of data warehousing and OLAP technology, ACM SIGMOD Record*, v.26 n. 1, p. 65-74, Mar. 1997, 65-74.
Chaudhuri, S. et al., "Database technology for decision support systems", *Chaudhuri, S.; Dayal, U.; ganti, V.; , "Database technology for decision support systems," Computer*, vol. 34, No. 12, pp. 48-55, Dec. 2001.
Colliat, George , "OLAP, relational, and multidimensional database systems", *George Colliat, OLAP, relational, and multidimensional database systems, ACM SIGMOD Record*, v.25 n. 3, p. 64-69, Sep. 1996, 64-69.
Fangyan, R et al., "Spatial Hierarchy and OLAP-Favored Search in Spatial Data Warehouse", Proceedings of the 6th ACM International Workshop on Data Warehousing and OLAP 2003 , 8.
Kimball, Ralph et al., "Why decision support fails and how to fix it", *Ralph Kimball, Kevin Strehlp, Why decision support fails and how to fix it, ACM Record*, v.24 n. 3, p. 92-97, Sep. 1995, 92-97.
"U.S. Appl. No. 12/020,740, Non-Final Office Action mailed Mar. 30, 2011", 8.
"U.S. Appl. No. 12/020,786, Final Office Action mailed Jan. 11, 2011", 10.

* cited by examiner

ATTRIBUTE SEGMENTS AND DATA TABLE BIAS REDUCTION

CROSS-REFERENCE TO RELATED APPLICATIONS

This application is a continuation-in-part of the following applications, each of which is hereby incorporated by reference in its entirety: U.S. patent application Ser. No. 12/021,263 filed Jan. 28, 2008, which claims the benefit of U.S. Prov. App. No. 60/886,798 filed on Jan. 26, 2007 and U.S. Prov. App. No. 60/886,801 filed Jan. 26, 2007; and U.S. patent application Ser. No. 10/783,323 filed Feb. 20, 2004 now U.S. Pat. No. 7,873,529.

This application claims the benefit of the following provisional applications, each of which is hereby incorporated by reference in its entirety U.S. Prov. App. No. 60/887,122 filed Jan. 29, 2007; U.S. Prov. App. No. 60/891,933 filed Feb. 27, 2007; U.S. Prov. App. No. 60/979,305 filed Oct. 11, 2007; and U.S. Prov. App. No. 60/891,507 filed Feb. 24, 2007.

This application is a continuation-in-part of the following U.S. patent application, which is incorporated by reference in its entirety: application Ser. No. 10/783,323 filed on Feb. 20, 2004 and entitled "System and Method for Analyzing and Correcting Retail Data."

BACKGROUND

1. Field

This invention relates to methods and systems for analyzing data, and more particularly to methods and systems for analyzing data associated with the sales and marketing efforts of enterprises.

2. Description of Related Art

Currently, there exists a large variety of data sources, such as panel data obtained from the inputs of consumers who are members of panels, fact data relating to products, sales, and many other facts associated with the sales and marketing efforts of an enterprise, and dimension data relating to dimensions along which an enterprise wishes to understand data, such as in order to analyze consumer behaviors, to predict likely outcomes of decisions relating to an enterprise's activities, and to project from sample sets of data to a larger universe. Conventional systems typically analyze data obtained from different sources separately. While each data type may provide an opportunity to analyze a particular aspect of consumer behavior, the utility of any single data type has inherent limitations.

Information systems are a significant bottle neck for market analysis activities. The architecture of information systems is often not designed to provide on-demand flexible access, integration at a very granular level, or many other critical capabilities necessary to support growth. Thus, information systems are counter-productive to growth. Hundreds of market and consumer databases make it very difficult to manage or integrate data. For example, there may be a separate database for each data source, hierarchy, and other data characteristics relevant to market analysis. Different market views and product hierarchies proliferate among manufacturers and retailers. Restatements of data hierarchies waste precious time and are very expensive. Navigation from among views of data, such as from global views to regional to neighborhood to store views is virtually impossible, because there are different hierarchies used to store data from global to region to neighborhood to store-level data. Analyses and insights often take weeks or months, or they are never produced. Insights are often sub-optimal because of silo-driven, narrowly defined, ad hoc analysis projects. Reflecting the ad hoc nature of these analytic projects are the analytic tools and infrastructure developed to support them. Currently, market analysis, business intelligence, and the like often use rigid data cubes that may include hundreds of databases that are impossible to integrate. These systems may include hundreds of views, hierarchies, clusters, and so forth, each of which is associated with its own rigid data cube. This may make it almost impossible to navigate from global uses that are used, for example, to develop overall company strategy, down to specific program implementation or customer-driven uses. These ad hoc analytic tools and infrastructure are fragmented and disconnected.

In sum, there are many problems associated with the data used for market analysis, and there is a need for a flexible, extendable analytic platform, the architecture for which is designed to support a broad array of evolving market analysis needs. Furthermore, there is a need for better business intelligence in order to accelerate revenue growth, make business intelligence more customer-driven, to gain insights about markets in a more timely fashion, and a need for data projection and release methods and systems that provide improved dimensional flexibility, reduced query-time computational complexity, automatic selection and blending of projection methodologies, and flexibly applied releasability rules.

SUMMARY

In embodiments, the present invention provides a method for updating data sources. The method may include identifying a plurality of data sources, identifying a plurality of overlapping attribute segments to use for comparing the data sources, calculating a factor as a function of each of the plurality of overlapping attribute segments, and using the factors to update a first group of values in the second data source to reduce bias. Further, at least a first data source may be more accurate than a second data source.

In embodiments, the data source may be a fact data source. Further, the fact data source may be a retail sales dataset, a point-of-sale dataset, a syndicated casual dataset, an internal shipment dataset, an internal financial dataset, a syndicated sales dataset, and the like. The syndicated sales dataset may further be a scanner dataset, an audit dataset, a combined scanner-audit dataset and the like.

In embodiments, the plurality of overlapping attribute segments may include a product attribute, a consumer attribute, and the like. The product attribute may be a nutritional level, a brand, a product category, and physical attributes such as flavor, scent, packaging type, product launch date, display location, and the like. The product attribute may be based at least in on a SKU.

In embodiments, the consumer attribute may include a consumer geography, a consumer category such as a core account shopper, a non-core account shopper, a top-spending shopper, and the like, a consumer demographic, a consumer behavior, a consumer life stage, a retailer-specific customer attribute, an ethnicity, an income level, presence of a child, age of a child, marital status, education level, job status, job type, pet ownership status, health status, wellness status, media usage type, media usage level, technology usage type, technology usage level, household member attitude, a user-created custom consumer attribute, and the like.

These and other systems, methods, objects, features, and advantages of the present invention will be apparent to those skilled in the art from the following detailed description of the preferred embodiment and the drawings. Capitalized terms used herein (such as relating to titles of data objects, tables, or the like) should be understood to encompass other similar content or features performing similar functions, except where the context specifically limits such terms to the use herein.

BRIEF DESCRIPTION OF THE FIGURES

The invention and the following detailed description of certain embodiments thereof may be understood by reference to the following figures.

DETAILED DESCRIPTION

Figure 1:
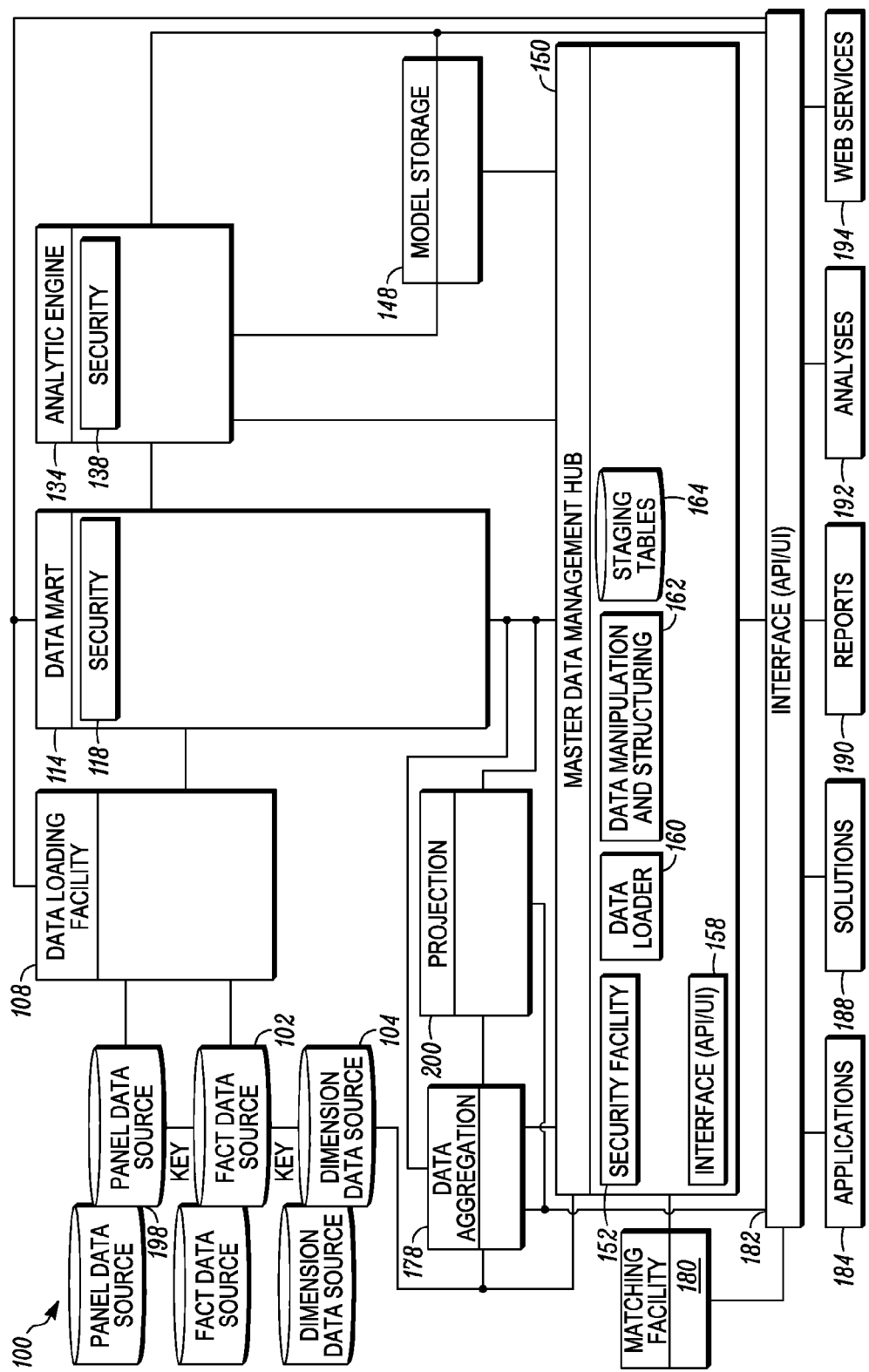
FIG. 1 illustrates an analytic platform for performing data fusion and associated data handling and analytic processes and methods.

An aspect of the present invention includes an analytic platform 100 that may be used to create an integrated, actionable view of consumers, consumer behavior, commodity sales, and other commercial activities, such as the relationship between consumers and stores, and the like. Currently, there exists a large variety of data sources, such as panel data sources 198, fact data sources 102, and dimension data sources 104, from which commercial activities, such as consumer behaviors, may be analyzed, projected, and used to better understand and predict commercial behavior. Available datasets may include retailer point-of-sale data, loyalty data, panel data (e.g., consumer network panel data), custom research data, attitude data, usage data, permission-based marketing data, manufacturer data, third-party data, scan key, data, or some other type of data associated with consumer behaviors. Each data type may provide an opportunity to analyze a particular aspect of consumer behavior. In an example, retailer point-of-sale data may be analyzed to see which products are purchased, where they are purchased, when the purchases took place, and so forth. While each data type has value, its utility may be limited to the confines of its derivation. What is needed are methods and systems that provide a means for combining, aggregating, fusing, blending, and reconfiguring multiple data types and sources into new hybrid, or fused, datasets that may through analysis yield new statistical inferences and projections of consumer behavior that may not be obtained through the use of the individual data types in isolation. The architecture of the analytic platform 100 illustrated in FIG. 1 may be used to run such methodologies and achieve these analytic objectives.

The methods and systems disclosed herein include, in certain embodiments, methods and systems for combining representations of raw data, computing hardware, and an analytic engine with a data management hub that is capable of handling disaggregated data and performing aggregation, calculation, functions, and real-time or quasi-real-time projections. The methods and systems reduce the reliance on fixed form datasets and add flexibility into the datasets such that the calculations and projections can be done in a fraction of the time as compared with older generation systems. In embodiments, data compression and aggregations of data may be done in conjunction with a user query such that the aggregation dataset can be specifically generated in a form most applicable for generating calculations and projections based on the query. In embodiments, data compression and aggregations of data may be done prior to, in anticipation of, and/or following a query. In embodiments, an analytic platform 100 (described in more detail below) may calculate projections and other solutions dynamically and create hierarchical data structures with custom dimensions that facilitate the analysis. Such methods and systems may be used to process POS data, retail information, geography information, causal information, survey information, census data and other forms of data and form assessments of past performance (e.g. estimating the past sales of a certain product within a certain geographical region over a certain period of time) or projections of future results (e.g. estimating the future or expected sales of a certain product within a certain geographical region over a certain period of time).

Referring to FIG. 1, the methods and systems disclosed herein are related to improved methods for handling and using data and metadata for the benefit of an enterprise. An analytic platform 100 may support and include such improved methods and systems. The analytic platform 100 may include, in certain embodiments, a range of hardware systems, software modules, data storage facilities, application programming interfaces, human-readable interfaces, and methodologies, as well as a range of applications, solutions, products, and methods that use various outputs of the analytic platform 100, as more particularly detailed herein, other embodiments of which would be understood by one of ordinary skill in the art and are encompassed herein. Among other components, the analytic platform 100 includes methods and systems for providing various representations of data and metadata, methodologies for acting on data and metadata, an analytic engine, and a data management facility that is capable of handling disaggregated data and performing aggregation, calculations, functions, and real-time or quasi-real-time projections. In certain embodiments, the methods and systems enable much more rapid and flexible manipulation of data sets, so that certain calculations and projections can be done in a fraction of the time as compared with older generation systems.

In embodiments, data compression and aggregations of data, such as fact data sources 102, and dimension data sources 104, may be performed in conjunction with a user query such that the aggregation dataset can be specifically generated in a form most applicable for generating calculations and projections based on the query. In embodiments, data compression and aggregations of data may be done prior to, in anticipation of, and/or following a query. In embodiments, an analytic platform 100 (described in more detail below) may calculate projections and other solutions dynamically and create hierarchical data structures with custom dimensions that facilitate the analysis. Such methods and systems may be used to process point-of-sale (POS) data, retail information, geography information, causal information, survey information, census data and other forms of data and forms of assessments of past performance (e.g. estimating the past sales of a certain product within a certain geographical region over a certain period of time) or projections of future results (e.g. estimating the future or expected sales of a certain product within a certain geographical region over a certain period of time). In turn, various estimates and projections can be used for various purposes of an enterprise, such as relating to purchasing, supply chain management, handling of inventory, pricing decisions, the planning of promotions, marketing plans, financial reporting, and many others.

Referring still to FIG. 1 an analytic platform 100 is illustrated that may be used to analyze and process data in a disaggregated or aggregated format, including, without limitation, dimension data defining the dimensions along which various items are measured and factual data about the facts that are measured with respect to the dimensions. Factual data may come from a wide variety of sources and be of a wide range of types, such as traditional periodic point-of-sale (POS) data, causal data (such as data about activities of an enterprise, such as in-store promotions, that are posited to cause changes in factual data), household panel data, frequent shopper program information, daily, weekly, or real time POS data, store database data, store list files, stubs, dictionary data, product lists, as well as custom and traditional audit data. Further extensions into transaction level data, RFID data and data from non-retail industries may also be processed according to the methods and systems described herein.

In embodiments, a data loading facility 108 may be used to extract data from available data sources and load them to or within the analytic platform 100 for further storage, manipulation, structuring, fusion, analysis, retrieval, querying and other uses. The data loading facility 108 may have the a plurality of responsibilities that may include eliminating data for non-releasable items, providing correct venue group flags for a venue group, feeding a core information matrix with relevant information (such as and without limitation statistical metrics), or the like. In an embodiment, the data loading facility 108 eliminate non-related items. Available data sources may include a plurality of fact data sources 102 and a plurality of dimension data sources 104. Fact data sources 102 may include, for example, facts about sales volume, dollar sales, distribution, price, POS data, loyalty card transaction files, sales audit files, retailer sales data, and many other fact data sources 102 containing facts about the sales of the enterprise, as well as causal facts, such as facts about activities of the enterprise, in-store promotion audits, electronic pricing and/or promotion files, feature ad coding files, or others that tend to influence or cause changes in sales or other events, such as facts about in-store promotions, advertising, incentive programs, and the like. Other fact data sources may include custom shelf audit files, shipment data files, media data files, explanatory data (e.g., data regarding weather), attitudinal data, or usage data. Dimension data sources 104 may include information relating to any dimensions along which an enterprise wishes to collect data, such as dimensions relating to products sold (e.g. attribute data relating to the types of products that are sold, such as data about UPC codes, product hierarchies, categories, brands, sub-brands, SKUs and the like), venue data (e.g. store, chain, region, country, etc.), time data (e.g. day, week, quad-week, quarter, 12-week, etc.), geographic data (including break-downs of stores by city, state, region, country or other geographic groupings), consumer or customer data (e.g. household, individual, demographics, household groupings, etc.), and other dimension data sources 104. While embodiments disclosed herein relate primarily to the collection of sales and marketing-related facts and the handling of dimensions related to the sales and marketing activities of an enterprise, it should be understood that the methods and systems disclosed herein may be applied to facts of other types and to the handling of dimensions of other types, such as facts and dimensions related to manufacturing activities, financial activities, information technology activities, media activities, supply chain management activities, accounting activities, political activities, contracting activities, and many others.

In an embodiment, the analytic platform 100 comprises a combination of data, technologies, methods, and delivery mechanisms brought together by an analytic engine. The analytic platform 100 may provide a novel approach to managing and integrating market and enterprise information and enabling predictive analytics. The analytic platform 100 may leverage approaches to representing and storing the base data so that it may be consumed and delivered in real-time, with flexibility and open integration. This representation of the data, when combined with the analytic methods and techniques, and a delivery infrastructure, may minimize the processing time and cost and maximize the performance and value for the end user. This technique may be applied to problems where there may be a need to access integrated views across multiple data sources, where there may be a large multi-dimensional data repository against which there may be a need to rapidly and accurately handle dynamic dimensionality requests, with appropriate aggregations and projections, where there may be highly personalized and flexible real-time reporting 190, analysis 192 and forecasting capabilities required, where there may be a need to tie seamlessly and on-the-fly with other enterprise applications 184 via web services 194 such as to receive a request with specific dimensionality, apply appropriate calculation methods, perform and deliver an outcome (e.g. dataset, coefficient, etc.), and the like.

The analytic platform 100 may provide innovative solutions to application partners, including on-demand pricing insights, emerging category insights, product launch management, loyalty insights, daily data out-of-stock insights, assortment planning, on-demand audit groups, neighborhood insights, shopper insights, health and wellness insights, consumer tracking and targeting, and the like.

A decision framework may enable new revenue and competitive advantages to application partners by brand building, product innovation, consumer-centric retail execution, consumer and shopper relationship management, and the like. Predictive planning and optimization solutions, automated analytics and insight solutions, and on-demand business performance reporting may be drawn from a plurality of sources, such as InfoScan, total C-scan, daily data, panel data, retailer direct data, SAP, consumer segmentation, consumer demographics, FSP/loyalty data, data provided directly for customers, or the like.

The analytic platform 100 may have advantages over more traditional federation/consolidation approaches, requiring fewer updates in a smaller portion of the process. The analytic platform 100 may support greater insight to users, and provide users with more innovative applications. The analytic platform 100 may provide a unified reporting and solutions framework, providing on-demand and scheduled reports in a user dashboard with summary views and graphical dial indicators, as well as flexible formatting options. Benefits and products of the analytic platform 100 may include non-additive measures for custom product groupings, elimination of restatements to save significant time and effort, cross-category visibility to spot emerging trends, provide a total market picture for faster competitor analysis, provide granular data on demand to view detailed retail performance, provide attribute driven analysis for market insights, and the like.

The analytic capabilities of the present invention may provide for on-demand projection, on-demand aggregation, multi-source master data management, and the like. On-demand projection may be derived directly for all possible geographies, store and demographic attributes, per geography or category, with built-in dynamic releasability controls, and the like. On-demand aggregation may provide both additive and non-additive measures, provide custom groups, provide cross-category or geography analytics, and the like. Multi-source master data management may provide management of dimension member catalogue and hierarchy attributes, processing of raw fact data that may reduce harmonization work to attribute matching, product and store attributes stored relationally, with data that may be extended independently of fact data, and used to create additional dimensions, and the like.

In addition, the analytic platform 100 may provide flexibility, while maintaining a structured user approach. Flexibility may be realized with multiple hierarchies applied to the same database, the ability to create new custom hierarchies and views, rapid addition of new measures and dimensions, and the like. The user may be provided a structured approach through publishing and subscribing reports to a broader user base, by enabling multiple user classes with different privileges, providing security access, and the like. The user may also be provided with increased performance and ease of use, through leading-edge hardware and software, and web application for integrated analysis.

In embodiments, the data available within a fact data source 102 and a dimension data source 104 may be linked, such as through the use of a key. For example, key-based fusion of fact 102 and dimension data 104 may occur by using a key, such as using the Abilitec Key software product offered by Acxiom, in order to fuse multiple sources of data. For example, such a key can be used to relate loyalty card data (e.g., Grocery Store 1 loyalty card, Grocery Store 2 loyalty card, and Convenience Store 1 loyalty card) that are available for a single customer, so that the fact data from multiple sources can be used as a fused data source for analysis on desirable dimensions. For example, an analyst might wish to view time-series trends in the dollar sales allotted by the customer to each store within a given product category.

In embodiments the data loading facility may comprise any of a wide range of data loading facilities, including or using suitable connectors, bridges, adaptors, extraction engines, transformation engines, loading engines, data filtering facilities, data cleansing facilities, data integration facilities, or the like, of the type known to those of ordinary skill in the art. In various embodiments, there are many situations where a store will provide POS data and causal information relating to its store. For example, the POS data may be automatically transmitted to the facts database after the sales information has been collected at the stores POS terminals. The same store may also provide information about how it promoted certain products, its store or the like. This data may be stored in another database; however, this causal information may provide one with insight on recent sales activities so it may be used in later sales assessments or forecasts. Similarly, a manufacturer may load product attribute data into yet another database and this data may also be accessible for sales assessment or projection analysis. For example, when making such analysis one may be interested in knowing what categories of products sold well or what brand sold well. In this case, the causal store information may be aggregated with the POS data and dimension data corresponding to the products referred to in the POS data. With this aggregation of information one can make an analysis on any of the related data.

Referring still to FIG. 1, data that is obtained by the data loading facility 108 may be transferred to a plurality of facilities within the analytic platform 100, including the data mart 114. In embodiments the data loading facility 108 may contain one or more interfaces 182 by which the data loaded by the data loading facility 108 may interact with or be used by other facilities within the platform 100 or external to the platform. Interfaces to the data loading facility 108 may include human-readable user interfaces, application programming interfaces (APIs), registries or similar facilities suitable for providing interfaces to services in a services oriented architecture, connectors, bridges, adaptors, bindings, protocols, message brokers, extraction facilities, transformation facilities, loading facilities and other data integration facilities suitable for allowing various other entities to interact with the data loading facility 108. The interfaces 182 may support interactions with the data loading facility 108 by applications 184, solutions 188, reporting facilities 190, analyses facilities 192, services 194 or other entities, external to or internal to an enterprise. In embodiments these interfaces are associated with interfaces 182 to the platform 100, but in other embodiments direct interfaces may exist to the data loading facility 108, either by other components of the platform 100, or by external entities.

Referring still to FIG. 1, in embodiments the data mart facility 114 may be used to store data loaded from the data loading facility 108 and to make the data loaded from the data loading facility 108 available to various other entities in or external to the platform 100 in a convenient format. Within the data mart 114 facilities may be present to further store, manipulate, structure, subset, merge, join, fuse, or perform a wide range of data structuring and manipulation activities. The data mart facility 114 may also allow storage, manipulation and retrieval of metadata, and perform activities on metadata similar to those disclosed with respect to data. Thus, the data mart facility 114 may allow storage of data and metadata about facts (including sales facts, causal facts, and the like) and dimension data, as well as other relevant data and metadata. In embodiments, the data mart facility 114 may compress the data and/or create summaries in order to facilitate faster processing by other of the applications 184 within the platform 100 (e.g. the analytic server 134). In embodiments the data mart facility 114 may include various methods, components, modules, systems, sub-systems, features or facilities associated with data and metadata.

In certain embodiments the data mart facility 114 may contain one or more interfaces 182 (not shown on FIG. 1), by which the data loaded by the data mart facility 114 may interact with or be used by other facilities within the platform 100 or external to the platform. Interfaces to the data mart facility 114 may include human-readable user interfaces, application programming interfaces (APIs), registries or similar facilities suitable for providing interfaces to services in a services oriented architecture, connectors, bridges, adaptors, bindings, protocols, message brokers, extraction facilities, transformation facilities, loading facilities and other data integration facilities suitable for allowing various other entities to interact with the data mart facility 114. These interfaces may comprise interfaces 182 to the platform 100 as a whole, or may be interfaces associated directly with the data mart facility 114 itself, such as for access from other components of the platform 100 or for access by external entities directly to the data mart facility 114. The interfaces 182 may support interactions with the data mart facility 114 by applications 184, solutions 188, reporting facilities 190, analyses facilities 192, services 194 (each of which is describe in greater detail herein) or other entities, external to or internal to an enterprise.

In certain optional embodiments, the security facility 118 may be any hardware or software implementation, process, procedure, or protocol that may be used to block, limit, filter or alter access to the data mart facility 114, and/or any of the facilities within the data mart facility 114, by a human operator, a group of operators, an organization, software program, bot, virus, or some other entity or program. The security facility 118 may include a firewall, an anti-virus facility, a facility for managing permission to store, manipulate and/or retrieve data or metadata, a conditional access facility, a logging facility, a tracking facility, a reporting facility, an asset management facility, an intrusion-detection facility, an intrusion-prevention facility or other suitable security facility.

Still referring to FIG. 1, the analytic platform 100 may include an analytic engine 134. The analytic engine 134 may be used to build and deploy analytic applications or solutions or undertake analytic methods based upon the use of a plurality of data sources and data types. Among other things, the analytic engine 134 may perform a wide range of calculations and data manipulation steps necessary to apply models, such as mathematical and economic models, to sets of data, including fact data, dimension data, and metadata. The analytic engine 134 may be associated with an interface 182, such as any of the interfaces described herein.

The analytic engine 134 may interact with a model storage facility 148, which may be any facility for generating models used in the analysis of sets of data, such as economic models, econometric models, forecasting models, decision support models, estimation models, projection models, and many others. In embodiments output from the analytic engine 134 may be used to condition or refine models in the model storage 148; thus, there may be a feedback loop between the two, where calculations in the analytic engine 134 are used to refine models managed by the model storage facility 148.

In embodiments, a security facility 138 of the analytic engine 134 may be the same or similar to the security facility 118 associated with the data mart facility 114, as described herein. Alternatively, the security facility 138 associated with the analytic engine 134 may have features and rules that are specifically designed to operate within the analytic engine 134.

As illustrated in FIG. 1, the analytic platform 100 may contain a master data management hub 150 (MDMH). In embodiments the MDMH 150 may serve as a central facility for handling dimension data used within the analytic platform 100, such as data about products, stores, venues, geographies, time periods and the like, as well as various other dimensions relating to or associated with the data and metadata types in the data sources 102, 104, the data loading facility 108, the data mart facility 114, the analytic engine 134, the model storage facility 148 or various applications, 184, solutions 188, reporting facilities 190, analytic facilities 192 or services 194 that interact with the analytic platform 100. The MDMH 150 may in embodiments include a security facility 152, an interface 158, a data loader 160, a data manipulation and structuring facility 162, and one or more staging tables 164. The data loader 160 may be used to receive data. Data may enter the MDMH from various sources, such as from the data mart 114 after the data mart 114 completes its intended processing of the information and data that it received as described herein. Data may also enter the MDMH 150 through a user interface 158, such as an API or a human user interface, web browser or some other interface, of any of the types disclosed herein or in the documents incorporated by reference herein. The user interface 158 may be deployed on a client device, such as a PDA, personal computer, laptop computer, cellular phone, or some other client device capable of handling data. In embodiments, the staging tables 164 may be included in the MDMH 150.

In embodiments, a matching facility 180 may be associated with the MDMH 150. The matching facility 180 may receive an input data hierarchy within the MDMH 150 and analyze the characteristics of the hierarchy and select a set of attributes that are salient to a particular analytic interest (e.g., product selection by a type of consumer, product sales by a type of venue, and so forth). The matching facility 180 may select primary attributes, match attributes, associate attributes, block attributes and prioritize the attributes. The matching facility 180 may associate each attribute with a weight and define a set of probabilistic weights. The probabilistic weights may be the probability of a match or a non-match, or thresholds of a match or non-match that is associated with an analytic purpose (e.g., product purchase). The probabilistic weights may then be used in an algorithm that is run within a probabilistic matching engine (e.g., IBM QualityStage). The output of the matching engine may provide information on, for example, other products which are appropriate to include in a data hierarchy, the untapped market (i.e. other venues) in which a product is probabilistically more likely to sell well, and so forth. In embodiments, the matching facility 180 may be used to generate projections of what types of products, people, customers, retailers, stores, store departments, etc. are similar in nature and therefore they may be appropriate to combine in a projection or an assessment.

Figure 5:
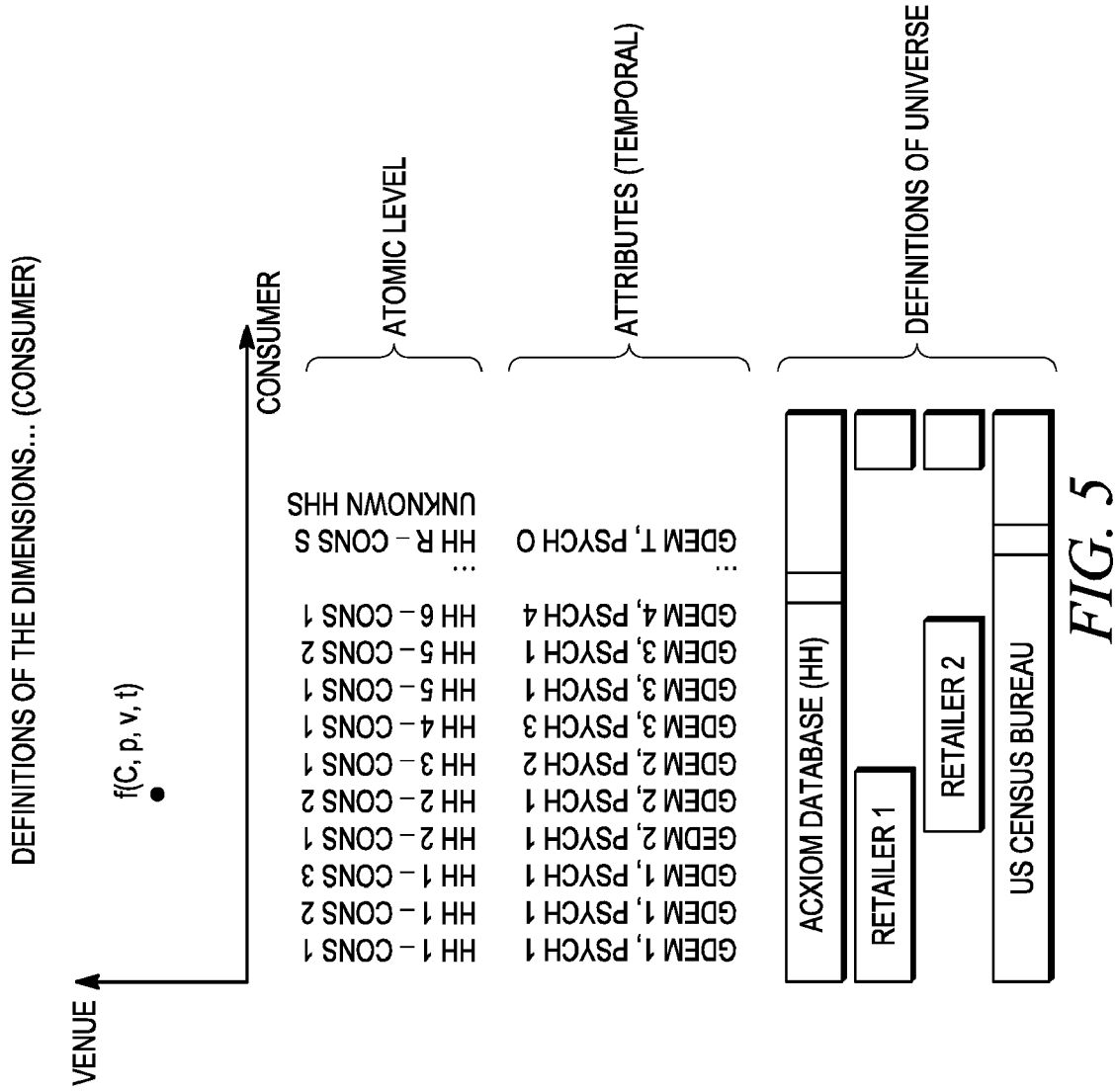
FIG. 5 conceptualizes the consumer data dimension.
Figure 6:
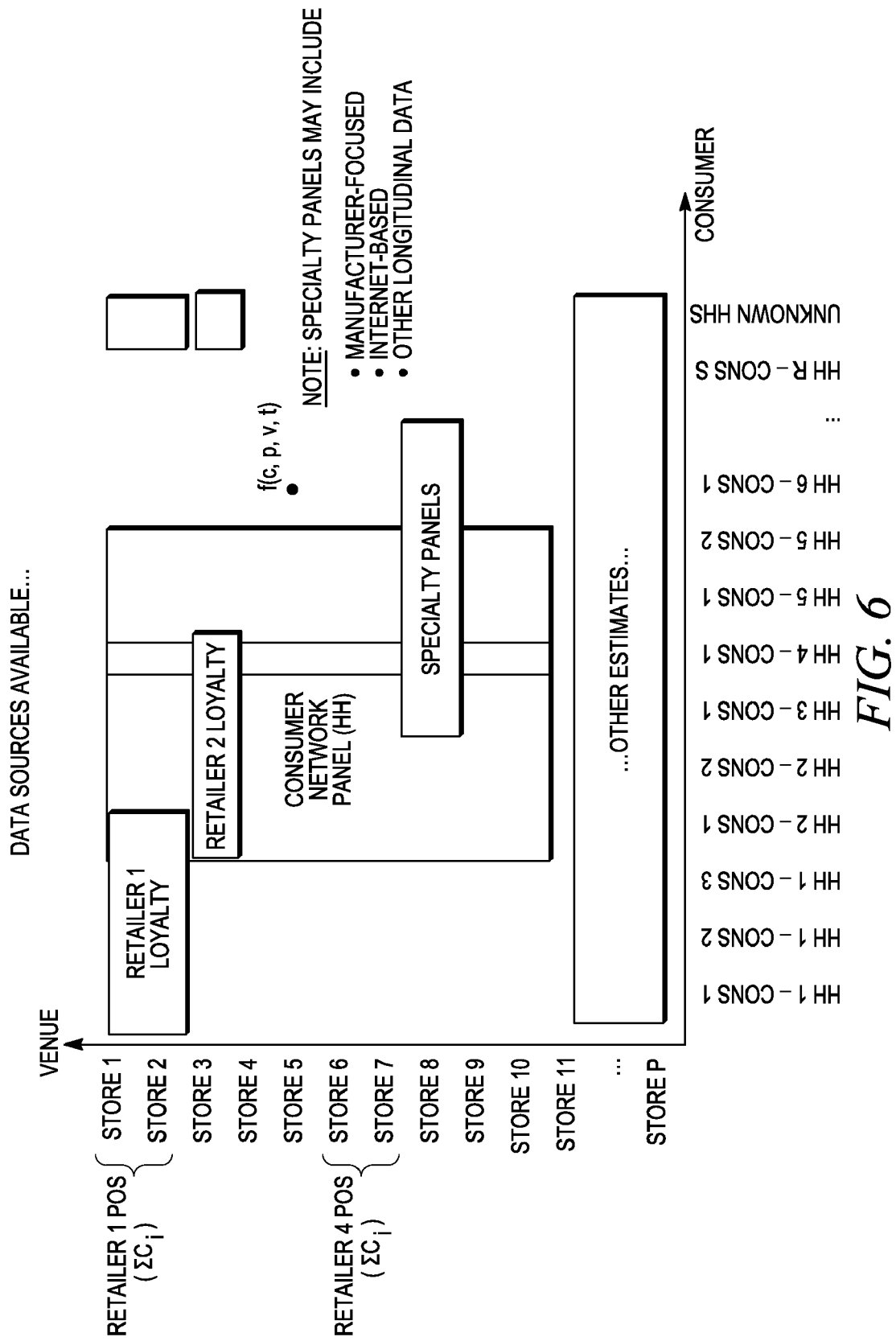
FIG. 6 illustrates a hypothetical example of how a plurality of data sources may be fused in an analytic example.
Figure 7:
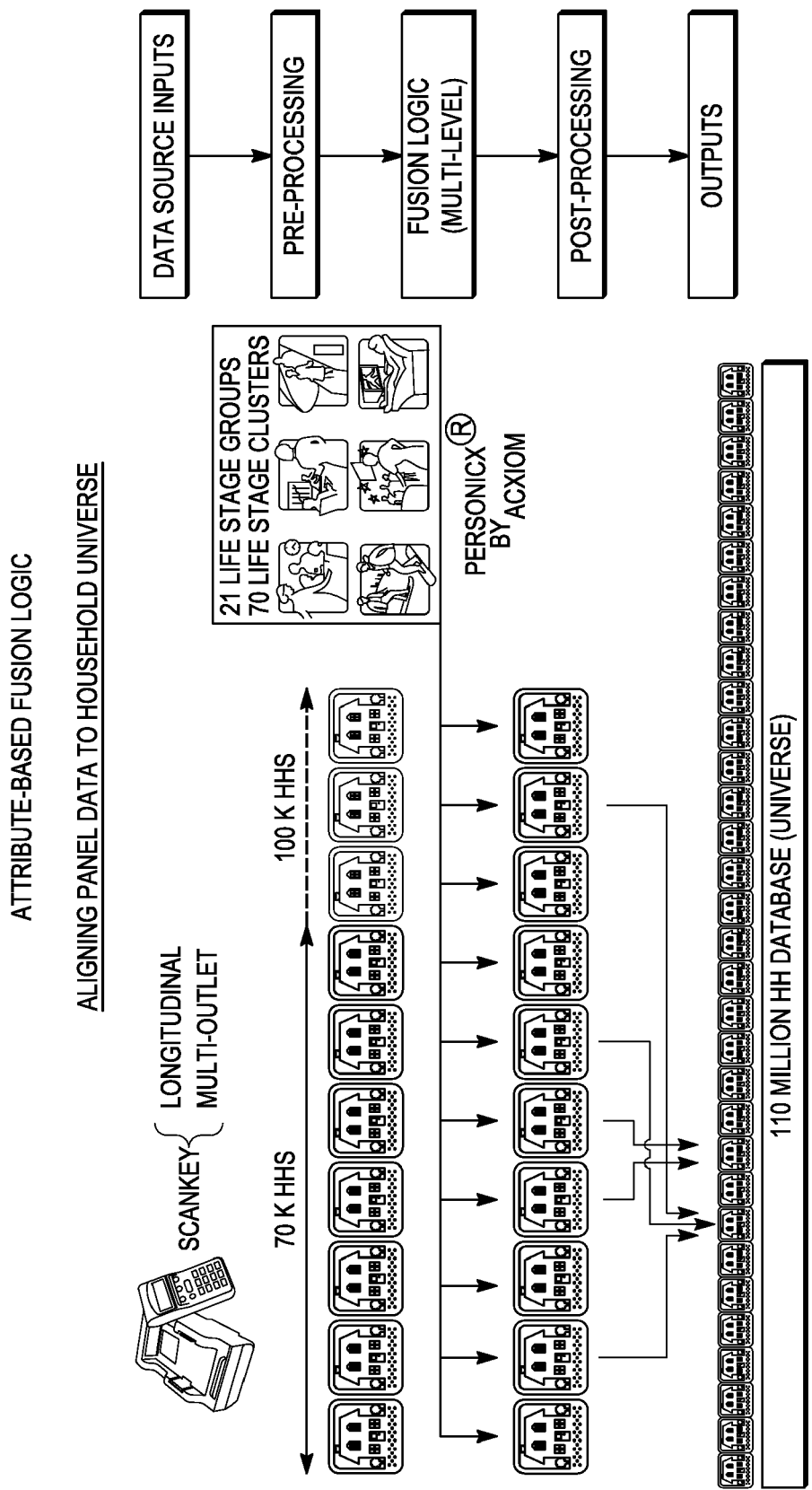
FIG. 7 illustrates one example of attribute-based fusion.
Figure 8:
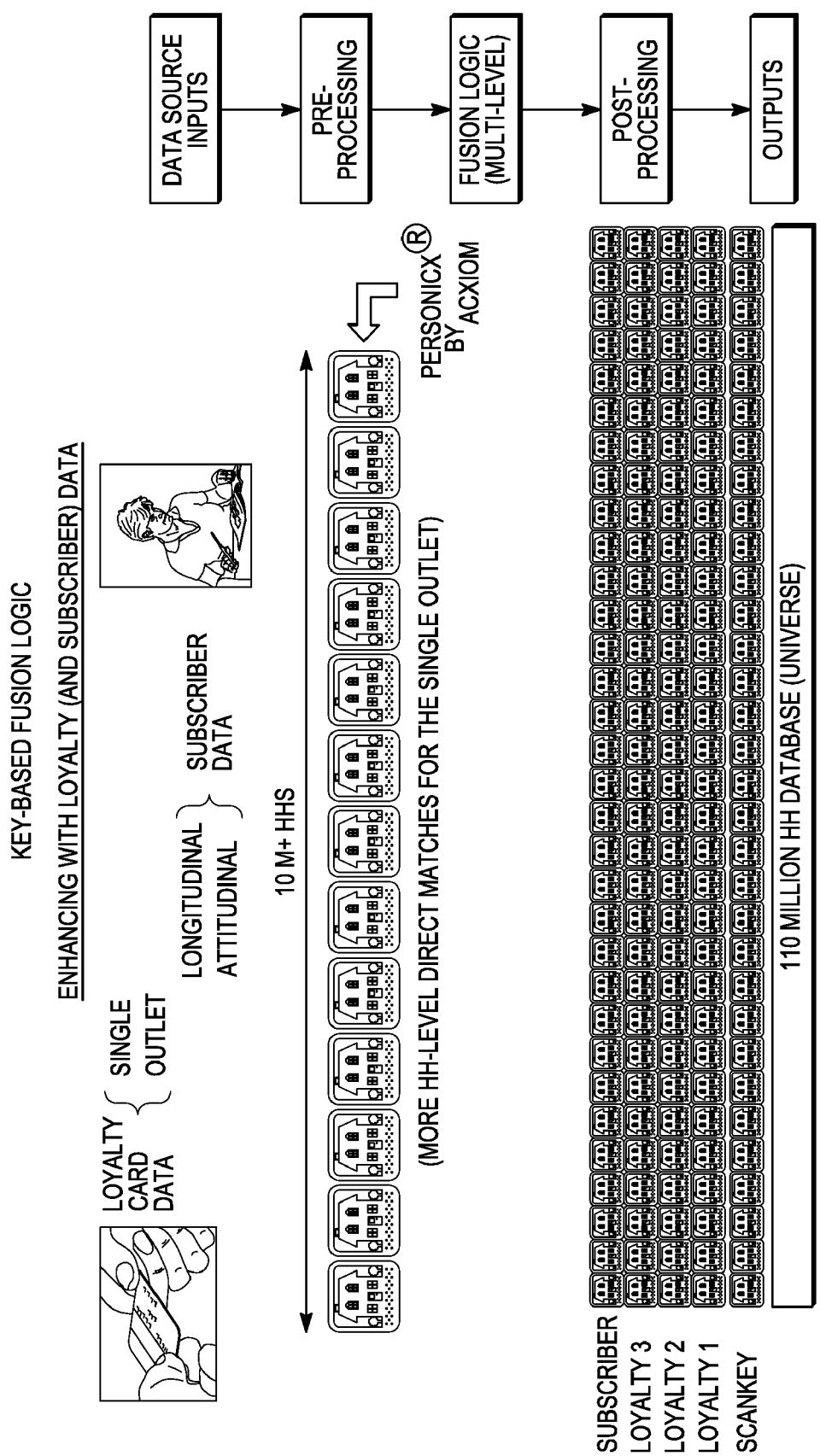
FIG. 8 illustrates one example of key-based fusion.

As illustrated in FIG. 1, the analytic platform 100 may include a data aggregation facility 178. The data aggregation facility may include a data fusion facility. A data fusion facility may be able to fuse, blend, combine, aggregate, join, merge, or perform some other data fusion technique on individual data types and sources, such as panel data sources 198, fact data sources 102, and dimension data sources 104 (FIG. 5), in order to create a "super panel" dataset that may be used to characterize the 111 million U.S. households at the household level. By fusing multiple data types and sources, such as specialty panels, loyalty data from retailers, and other consumer data sources against a consumer "universe" framework based upon industry standard population databases, such as Acxiom's InfoBase, new analyses may be possible that yield new analytic insight into market behavior (see FIG. 5-8). This fusion may be conducted using a data fusion facility 178 and may be done based upon household attributes/clusters or at the exact household-level via the use of encryption keys. In embodiments, an encryption key may be normal, obfuscated, or irreversible depending on its use and/or application. This may extend the utility of available datasets by providing new analytic output and projections that are not derivable from, for example, panel data alone.

In embodiments, the fusion of multiple data types and sources may construct a super panel of U.S. household data through the use of multi-level data fusion logic operating within a data fusion facility 178, that may be associated with a data loading facility 108, a data mart 114, an analytic server 134, a MDMH 150, an interface 182, or some other facility. This super panel may be analyzed within the context of a generalized, or "universe," framework within which various data sources' measures of, for example, the timing of product purchases, may be aligned, compared, and merged using the methods and systems of the present invention described herein. In embodiments, such super panels or specialty panel datasets may be used in combination with psychographic/demographic segmentation schemas to impute household-level purchases across the universe of U.S. households. These estimates may then be fused with other data sources for further analysis. For example, a data source may provide a household-level match. Its estimate may then be blended directly with the initial estimate by using, for example, an inverse-variance-weighted approach. If a household-level match is not available, the initial and the new estimates may be competitively fused along an aggregate of the consumer/ household, venue, product, time, or some other dimension, with the subsequent disaggregation of the results via imputation along household attributes/clusters. Complementary fusion may be used to fill in "voids" in the data framework. In embodiments, this fusion of datasets may be iterated across data sources at the appropriate levels of aggregation. This may have the effect of creating increasingly accurate estimates at the household level. Household-level results may then be aggregated and competed against measures that are available only at aggregate levels (e.g., store point-of-sale data.) Examples of data sources that may be fused in this way include loyalty data from one or more retailers, custom research data, attitude and usage data, permission-based marketing data, or some other consumer or commercial data.

As illustrated in FIG. 1, the analytic platform 100 may include a projection facility 200. A projection facility 200 may be used to produce projections, whereby a partial data set (such as data from a subset of stores of a chain) is projected to a universe (such as all of the stores in a chain), by applying appropriate weights to the data in the partial data set. A wide range of potential projection methodologies exist, including cell-based methodologies, store matrix methodologies, iterative proportional fitting methodologies, virtual census methodologies, and others. The methodologies can be used to generate projection factors. As to any given projection, there is typically a tradeoff among various statistical quality measurements associated with that type of projection. Some projections are more accurate than others, while some are more consistent, have less spillage, are more closely calibrated, or have other attributes that make them relatively more or less desirable depending on how the output of the projection is likely to be used. In embodiments of the platform 100, the projection facility 200 takes dimension information from the MDMH 150 or from another source and provides a set of projection weightings along the applicable dimensions, typically reflected in a matrix of projection weights, which can be applied at the data mart facility 114 to a partial data set in order to render a projected data set. The projection facility 200 may have an interface 182 of any of the types disclosed herein.

In embodiments, the analytic platform 100 may enable retailer-manufacturer models including, but not limited to, sharing information related to supply chain, forecasting, ordering, UCCnet-related models, create/share store groups and store clusters, and the related attributes (and related attributes), create/share retailer definition of product hierarchies/category definitions (and related attributes), create/share retailer shopper group definitions (based on demographics and other household attributes), collaboration with item master data for purpose of automated item matching and mapping—involving a 3rd party to facilitate the mapping through providing a common item master, or some other model basis.

In embodiments, retailers that provide loyalty data to a market analytic service for analysis may consider themselves at a disadvantage to free-riding, non-participating retailers in that users of the service that have the opportunity to see the participating retailers' loyalty data, whereas the participating retailers may only see approximations of the non-participating retailers' data. In theory, non-participating retailers could use this information asymmetry to their competitive advantage. As a consequence, this asymmetry may serve to reduce the appeal of participation.

In embodiments of the present invention, methods may be used by which participating retailers' loyalty data may be used to enhance the accuracy of the consumer targeting and tracking while obfuscating the disaggregated data in such a way as to remove any advantage that non-participating retailers might enjoy. In embodiments, there may be varying levels of distortion applied to the data, for example, aligned with a tiered service offering. Further, while a participating retailer's data may be disguised from non-participating retailers, it may be made available in its most accurate form to the participating retailers, and to parties with whom they wish to share it.

As described herein, the fusion of multiple data sources (e.g., store-level POS data, household-level consumer panel data, loyalty card data, etc.) to provide enhanced estimates and understanding of household-level purchasing behavior may be dependent upon retailers' willingness to share data with an analyst. This may be especially true for the highly-granular "loyalty data" collected by retailers. In order to address the concerns of retailers who feel that participating may place them at a competitive disadvantage versus non-participating retailers (due to the increased visibility of the participating retailers' performance), data obfuscation methods may be used.

As background to data obfuscation methods, it may be noted that there are two components to the total error in any estimate:

$$(\text{Total Error})^2 = (\text{Sampling Error})^2 + (\text{Bias})^2$$

Sampling errors are those errors attributable to the normal (random) variation that would be expected due to the fact that, by the very act of sampling, measurements are not being taken from the entire population. Biases are systematic errors that affect any sample taken by a particular sampling method. The data fusion methods described herein may utilize, for example, consumer panel and store POS data sources to develop an estimate of household-level purchases for the "universe" of U.S. households—where, for example, the universe may be defined by a data source such as the Acxiom InfoBase. While these approaches may remove much of the bias present, the sampling error (due to the underlying panel data source) may remain. A retailer's loyalty card data may address both of the remaining sources of error in three, related ways: 1) a retailer's loyalty card data may represent exact measurements of a household's purchases in a retailer's venues (subject to certain non-compliance issues). Thus, the estimated purchases for these household-venue combinations may be replaced with the actual purchases; 2) by using the data fusion approaches described herein, the initially-estimated purchases for households may be analytically compared with the households' actual purchases to identify, quantify, and model/correct for some or all of the remaining source(s) of bias. These biases may, then, be modeled out of the estimated behaviors of households in other, non-participating retailers—thereby improving the accuracy of those estimates, and; 3) while somewhat related to items 1 and 2, to the extent that the actual purchase data from the loyalty card households may be leveraged for feedback on an initial model's estimates, the overall modeling approach may be enhanced and/or corrected. A tactical example of this may be the use of household data at an aggregated level as an "auxiliary variable" against which to adjust the estimates, with the potential to reduce the sampling error. In embodiments, these three methods may be applied sequentially or concurrently across multiple retailers' loyalty data sources.

As shown in FIG. 1, an interface 182 may be included in the analytic platform 100. In embodiments, data may be transferred to the MDMH 150 of the platform 100 using a user interface 182. The interface 182 may be a web browser operating over the Internet or within an intranet or other network, it may be an analytic engine 134, an application plug-in, or some other user interface that is capable of handling data. The interface 182 may be human readable or may consist of one or more application programming interfaces, or it may include various connectors, adaptors, bridges, services, transformation facilities, extraction facilities, loading facilities, bindings, couplings, or other data integration facilities, including any such facilities described herein or in documents incorporated by reference herein.

As illustrated in FIG. 1, the platform 100 may interact with a variety of applications 184, solutions 188, reporting facilities 190, analytic facilities 192 and services 194, such as web services, or with other platforms or systems of an enterprise or external to an enterprise. Any such applications 184, solutions 188, reporting facilities 190, analytic facilities 192 and services 194 may interact with the platform 100 in a variety of ways, such as providing input to the platform 100 (such as data, metadata, dimension information, models, projections, or the like), taking output from the platform 100 (such as data, metadata, projection information, information about similarities, analytic output, output from calculations, or the like), modifying the platform 100 (including in a feedback or iterative loop), being modified by the platform 100 (again optionally in a feedback or iterative loop), or the like.

In embodiments one or more applications 184 or solutions 188 may interact with the platform 100 via an interface 182. Applications 184 and solutions 188 may include applications and solutions (consisting of a combination of hardware, software and methods, among other components) that relate to planning the sales and marketing activities of an enterprise, decision support applications, financial reporting applications, applications relating to strategic planning, enterprise dashboard applications, supply chain management applications, inventory management and ordering applications, manufacturing applications, customer relationship management applications, information technology applications, applications relating to purchasing, applications relating to pricing, promotion, positioning, placement and products, and a wide range of other applications and solutions.

In embodiments, applications 184 and solutions 188 may include analytic output that is organized around a topic area. For example, the organizing principle of an application 184 or a solution 188 may be a new product introduction. Manufacturers may release thousands of new products each year. It may be useful for an analytic platform 100 to be able to group analysis around the topic area, such as new products, and organize a bundle of analyses and workflows that are presented as an application 184 or solution 188. Applications 184 and solutions 188 may incorporate planning information, forecasting information, "what if?" scenario capability, and other analytic features. Applications 184 and solutions 188 may be associated with web services 194 that enable users within a client's organization to access and work with the applications 184 and solutions 188.

In embodiments, the analytic platform 100 may facilitate delivering information to external applications 184. This may include providing data or analytic results to certain classes of applications 184. For example and without limitation, an application may include enterprise resource planning/backbone applications 184 such as SAP, including those applications 184 focused on Marketing, Sales & Operations Planning and Supply Chain Management. In another example, an application may include business intelligence applications 184, including those applications 184 that may apply data mining techniques. In another example, an application may include customer relationship management applications 184, including customer sales force applications 184. In another example, an application may include specialty applications 184 such as a price or SKU optimization application. The analytic platform 100 may facilitate supply chain efficiency applications 184. For example and without limitation, an application may include supply chain models based on sales out (POS/FSP) rather than sales in (Shipments). In another example, an application may include RFID based supply chain management. In another example, an application may include a retailer co-op to enable partnership with a distributor who may manage collective stock and distribution services. The analytic platform 100 may be applied to industries characterized by large multi-dimensional data structures. This may include industries such as telecommunications, elections and polling, and the like. The analytic platform 100 may be applied to opportunities to vend large amounts of data through a portal with the possibility to deliver highly customized views for individual users with effectively controlled user accessibility rights. This may include collaborative groups such as insurance brokers, real estate agents, and the like. The analytic platform 100 may be applied to applications 184 requiring self monitoring of critical coefficients and parameters. Such applications 184 may rely on constant updating of statistical models, such as financial models, with real-time flows of data and ongoing re-calibration and optimization. The analytic platform 100 may be applied to applications 184 that require breaking apart and recombining geographies and territories at will.

Figure 2:
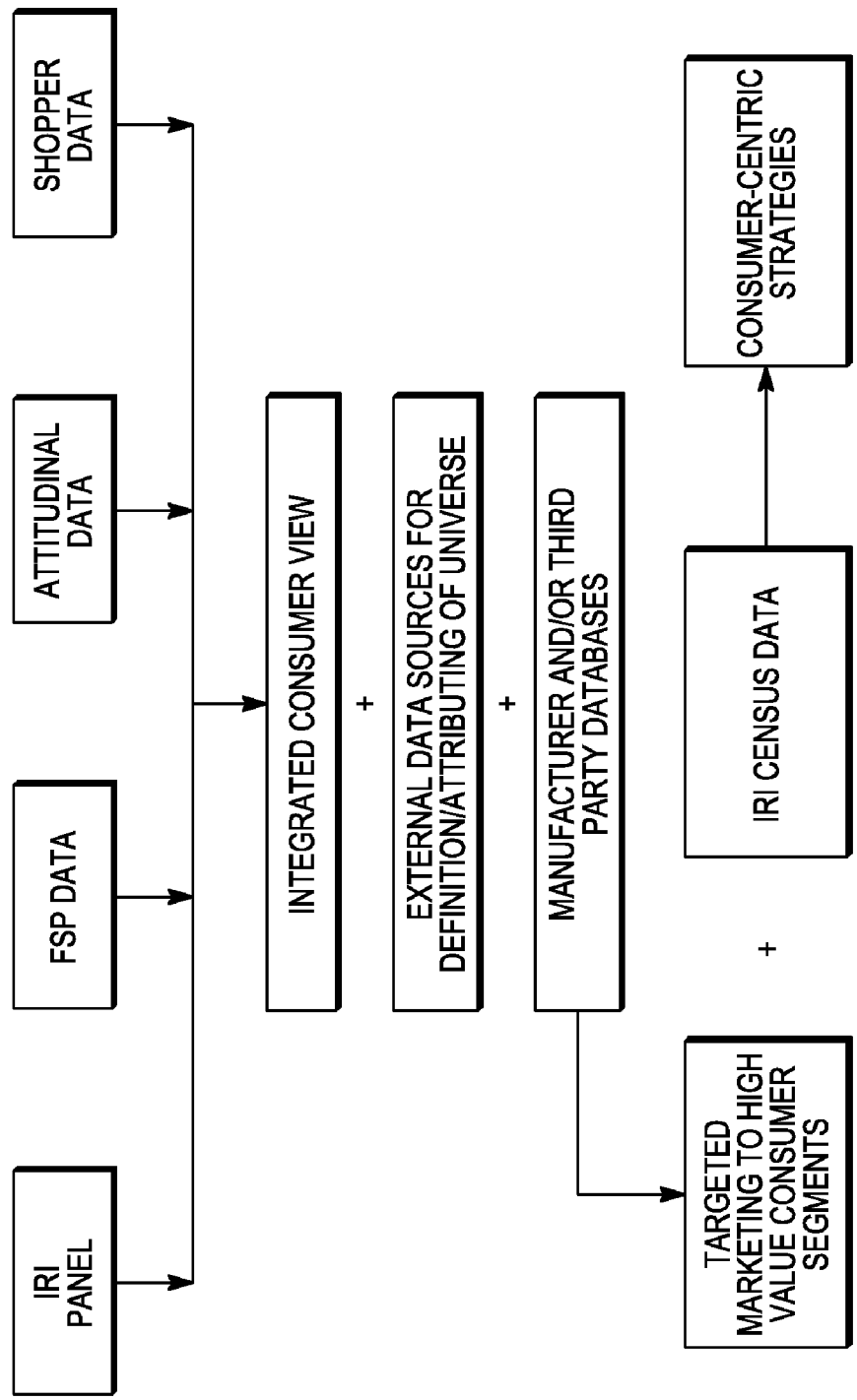
FIG. 2 depicts one possible embodiment of a generalized data fusion process.
Figure 3:
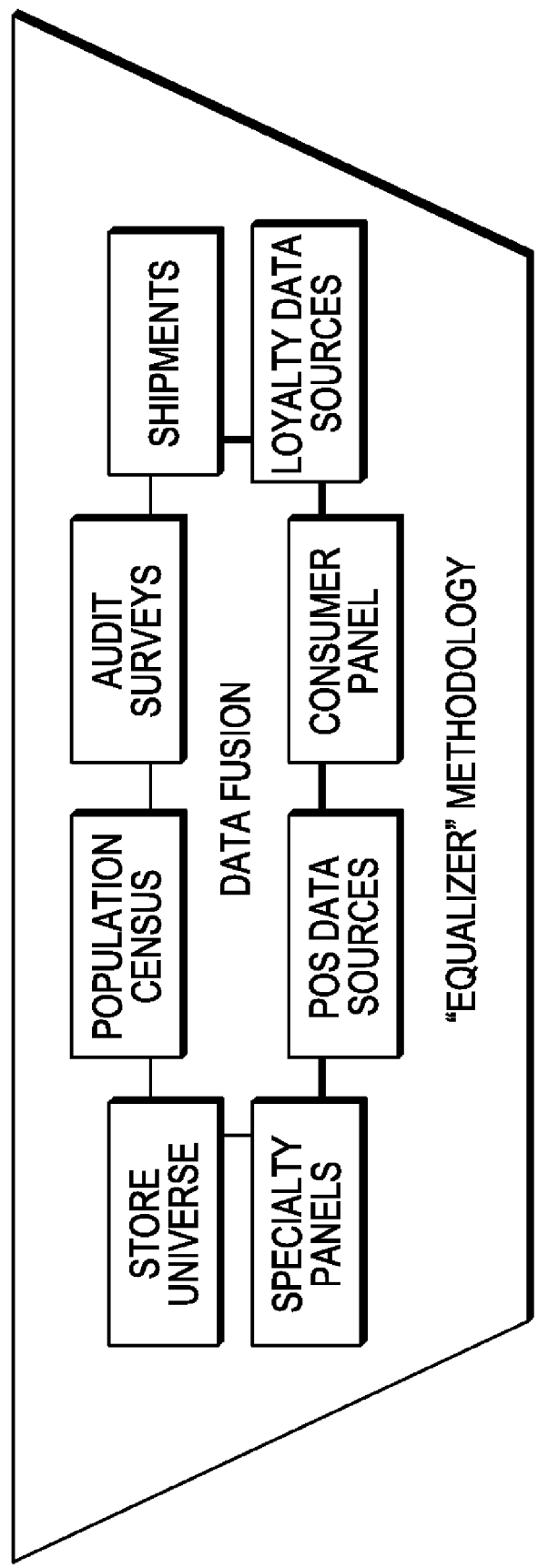
FIG. 3 shows a sampling of the possible data types and sources that may be used by the methods and systems of the present invention.
Figure 4:
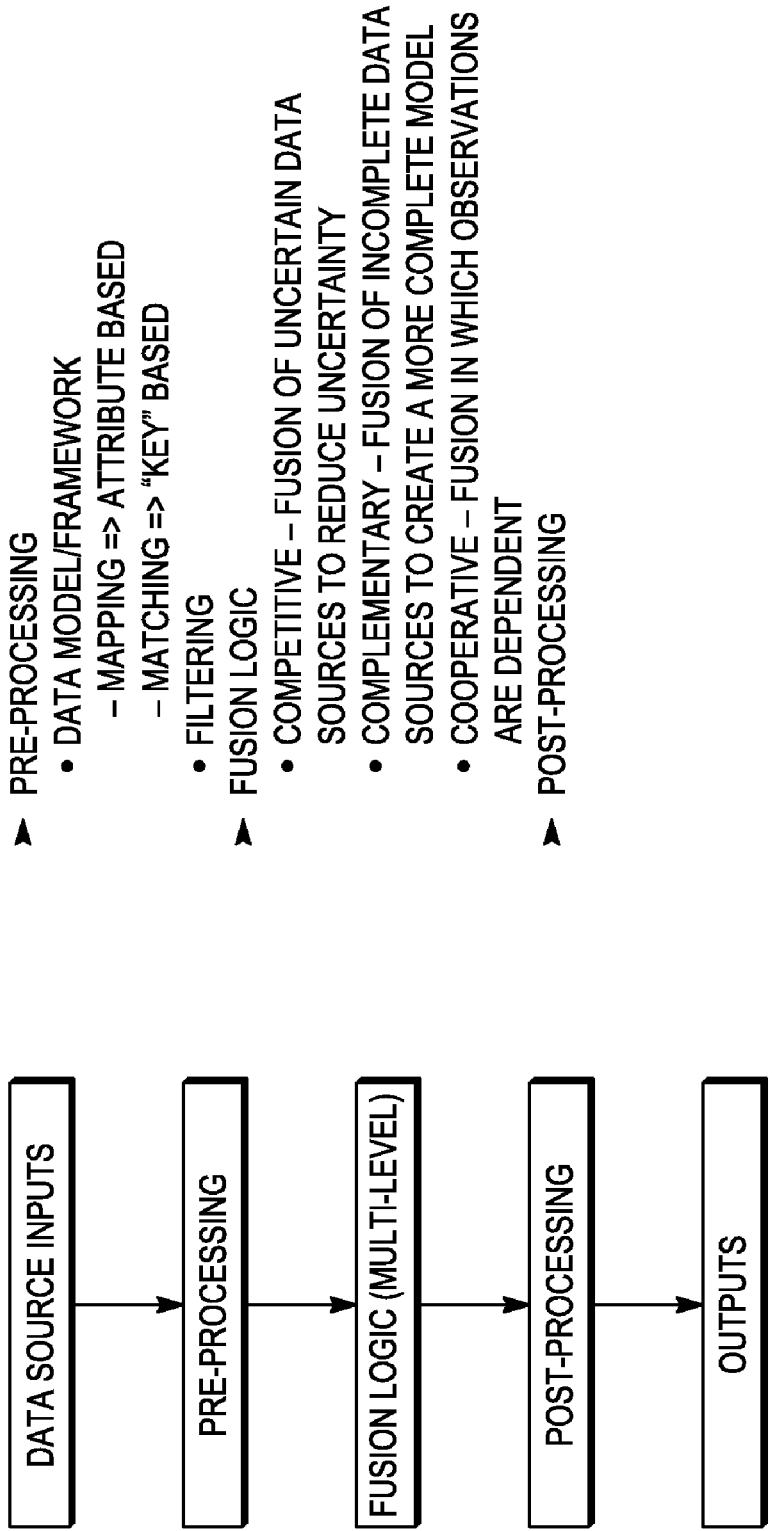
FIG. 4 shows a generalized data fusion process flow.

As illustrated in FIG. 2, such methods and systems may be used to process POS data, retail information, geography information, causal information, survey information, census data and other forms of data and form assessments of past performance (e.g. estimating the past sales of a certain product within a certain geographical region over a certain period of time) or projections of future results (e.g. estimating the future or expected sales of a certain product within a certain geographical region over a certain period of time). FIG. 3 shows a sampling of the possible data types and sources that may be used by the methods and systems of the present invention. FIG. 4 shows a generalized data fusion process flow.

Figure 9:
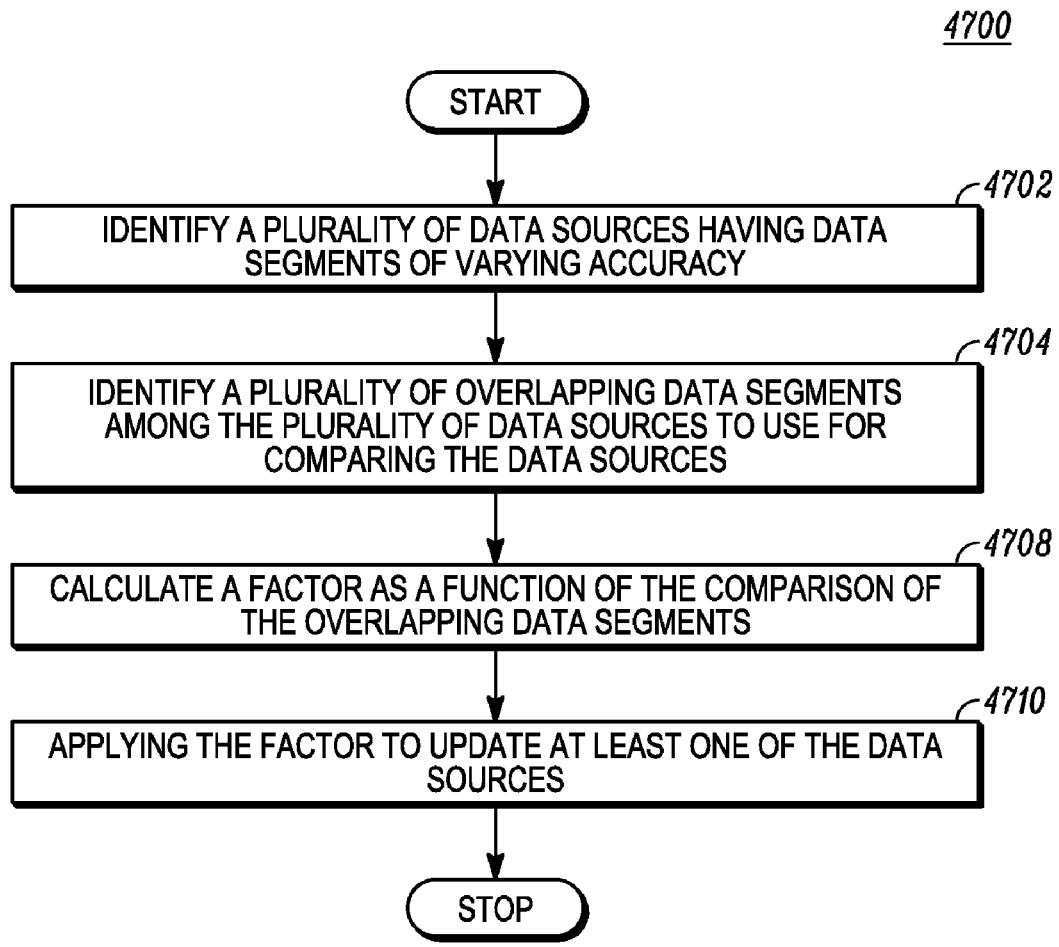
FIG. 9 depicts attribute segments and data table bias reduction.

Referring to FIG. 9, a logical process 4700 in accordance with various embodiments of the present invention is shown. The process 4700 is shown to include various logical blocks. However, it should be noted that the process 4700 may have all or fewer of the logical blocks shown in the FIG. 47. Further, those skilled in the art would appreciate that the logical process 4700 can have more logical blocks in addition to the logical blocks depicted in the FIG. 47 without deviating from the scope of the invention.

In embodiments, a plurality of data sources may be identified at logical block 4702. The data sources may have data segments of varying accuracy. The data sources may be a fact data source similar to the fact data source 102. The fact data source may be a retail sales dataset, a point-of-sale dataset, a syndicated casual dataset, an internal shipment dataset, an internal financial dataset, a syndicated sales dataset, and the like. The syndicated sales dataset may further be a scanner dataset, an audit dataset, a combined scanner-audit dataset and the like.

In embodiments, the data sources may be such that the plurality of data sources have data segments of varying accuracy. For example, in case the data sources are retail sales datasets for financial year 2006-07, then the retail sales dataset which was updated most recently may be considered as the most accurate dataset. Further, at least a first data source may be more accurate than a second data source.

Following the identification of the data sources, a plurality of attribute segments that may be used for comparing the data sources may be identified at logical block 4704. For example, in case the identified data sources include a retail sales data set and a point-of-sale dataset. The retail sales dataset may include attributes such as amount of sale, retailer code, date of sale and the like. Similarly, the attributes for the point-of-sale dataset may be venue of sale, retailer code, date of sale, and the like. In this case, attributes such as retailer code and date of sale are overlapping attribute segments and may be used for comparing the data sources.

Further, the plurality of overlapping attribute segments may include a product attribute, a consumer attribute, and the like. The product attribute may be a nutritional level, a brand, a product category, and physical attributes such as flavor, scent, packaging type, product launch date, display location, and the like. The product attribute may be based at least in on a SKU.

The consumer attribute may include a consumer geography, a consumer category such as a core account shopper, a non-core account shopper, a top-spending shopper, and the like, a consumer demographic, a consumer behavior, a consumer life stage, a retailer-specific customer attribute, an ethnicity, an income level, presence of a child, age of a child, marital status, education level, job status, job type, pet ownership status, health status, wellness status, media usage type, media usage level, technology usage type, technology usage level, household member attitude, a user-created custom consumer attribute, and the like.

Further, the overlapping attribute segments may include venue data (e.g. store, chain, region, country, etc.), time data (e.g. day, week, quad-week, quarter, 12-week, etc.), geographic data (including breakdowns of stores by city, state, region, country or other geographic groupings), and the like.

At logical block 4708, a factor as a function of each of the plurality of overlapping attribute segments may be calculated. Following this, the factors calculated at logical block 4708 may be used to update a group of values in the less accurate data sources, such as the second data source at logical block 4710. This may reduce the bias in the data sources.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A non-transitory computer readable medium bearing instructions that, when executed, cause one or more computers to:

identify:
retail data associated with a first entity, the retail data including data from a first data source and a second data source, the retail data further including product identifiers;
retail data associated with a second entity, the retail data including product identifiers, the retail data including data from a third data source; and
a plurality of factor calculations;
retrieve, based on the product identifiers, a plurality of overlapping attribute segments to use for comparing the data from the first and second data sources;
compare the plurality of the overlapping attribute segments;
calculate a plurality of factors for each of the overlapping attribute segments, each factor representing a bias present in the second data source, and
use the factors to adjust the values in the retail data from the third data source, thereby reduce bias present in the third source.

2. The medium of claim 1, wherein the instructions further cause the one or more computers to use the factors to update the retail data from the third data source to reduce incompleteness.

3. The medium of claim 2, wherein the instructions further cause the one or more computers to calculate a blended factor when at least two measures are available for a same factor, said blended factor being used to reduce bias in the second or third data source.

4. The medium of claim 2, wherein the instructions further cause the one or more computers to calculate a blended factor when at least two measures are available for a same factor, said blended factor being used to reduce bias in the second data source.

5. The medium of claim 1, wherein the instructions further cause the one or more computers to calculate the factor for an overlapping attribute segment by dividing a first data source volume amount by a corresponding second data source volume amount.

6. The medium of claim 1, wherein the instructions further cause the one or more computers to apply the factor for the attribute segment to the retail data from the third data source by multiplying a plurality of third data source volume amounts by the factor for the corresponding attribute segment.

7. The medium of claim 6, wherein the instructions further cause the one or more computers to calculate the blended factor by giving a more accurate data source a higher relative weight and by giving a less accurate data source a lower relative weight.

8. The medium of claim 1, wherein the instructions further cause the one or more computers to only calculate the factors for each attribute that is identified in the server to be relevant.

9. The medium of claim 1, wherein the instructions further cause the one or more computers to only calculate the factors for attribute segments that are determined to be significant.

10. The medium of claim 9, wherein the instructions further cause the one or more computers to calculate the blended factor by giving the more accurate data source a higher relative weight and by giving the less accurate data source a lower relative weight.

11. The medium of claim 1, wherein the instructions further cause the one or more computers to save each factor in a database.

* * * * *